US006497532B1

(12) United States Patent
McGinn (10) Patent No.: US 6,497,532 B1
(45) Date of Patent: *Dec. 24, 2002

(54) STRUCTURAL MEMBER FOR COMPOSITE ASSEMBLY DEVICE AND METHOD FOR EROSION CONTROL AND SEDIMENT RETENTION

(76) Inventor: John McGinn, 1150 Ballena Blvd., #250, Alameda, CA (US) 94501

( * ) Notice: Subject to any disclaimer, the term of this patent is extended or adjusted under 35 U.S.C. 154(b) by 0 days.

This patent is subject to a terminal disclaimer.

(21) Appl. No.: 09/458,176

(22) Filed: Dec. 9, 1999

Related U.S. Application Data (63) Continuation-in-part of application No. 09/012,341, filed on Jan. 23, 1998, now Pat. No. 6,277,473.

(51) Int. Cl.$^7$ ................................................ E02B 3/04
(52) U.S. Cl. ............................ 405/27; 405/16; 405/21; 405/30; 405/33; 428/188
(58) Field of Search ............................ 405/16, 21, 27, 405/30, 33; 14/13, 14, 74.5; 446/112, 125; 434/211; 249/64; 428/188

(56) References Cited

U.S. PATENT DOCUMENTS

| | | | | |
|---|---|---|---|---|
| RE18,365 E | * | 3/1932 | Anderson | |
| 4,118,937 A | * | 10/1978 | Mansen | |
| 4,241,117 A | * | 12/1980 | Figge | |
| 4,582,758 A | * | 4/1986 | Bruce et al. | |
| 4,588,325 A | * | 5/1986 | Seefert | |
| 4,703,594 A | * | 11/1987 | Reber | |
| 4,710,057 A | * | 12/1987 | Laier | |
| 5,229,187 A | * | 7/1993 | McGinn | |
| 5,658,096 A | * | 8/1997 | Von Kanel | |
| 6,277,473 B1 | * | 8/2001 | McGinn | |

* cited by examiner

Primary Examiner—Heather Shackelford
Assistant Examiner—Katherine Mitchell (57) ABSTRACT

The present invention is a general structural member assembly. A basic structural unit of the present invention has two adjacent shafts, both further having a cross sectionally triangular shape with a longitudinal side completely or substantially mostly removed to form legs. The leg ends are formed or machined such that they present two outward surfaces generally parallel to the open face of a first adjacent shaft. The outward surfaces of the leg ends are then positionally fixed, albeit with some flexible movement in some embodiments, to generally have a parallel and longitudinal interface with the longitudinal outside edges of a solid side of a second shaft. A stacked assembly may be formed from the structural members capable of sediment retention or accumulation.

4 Claims, 11 Drawing Sheets

Wrapping / Laminate External Support

STRUCTURAL MEMBER FOR COMPOSITE ASSEMBLY DEVICE AND METHOD FOR EROSION CONTROL AND SEDIMENT RETENTION

This is a continuation in part of U.S. patent application Ser. No. 09/012,341 filed Jan. 23, 1998, issued on Aug. 21, 2001 as U.S. Pat. No. 6,277,473.

BACKGROUND OF THE INVENTION

This invention relates to structural members. This invention also relates to erosion control systems, and more particularly, to a composite of substantially parallel elements connected therefore.

In a previously filed application, an invention was disclosed relating to rods and shafts which are suitable for use in the construction of tapered and parallel edged fishing rods, golf shafts, yacht masts, sailboard masts and the like.

Fishing rods, golf shafts, yacht masts, sailboard masts, and the like are generally constructed of fibre-resin composites or metal in the form of solid rods or tubes. Hollow composite rods are accepted as being superior in performance to solid composite rods in light weight uses but they are delicate and easily damaged. Solid metal rods and metal tubes are generally inferior in flexural characteristics to the composite rods. It will be apparent to the skilled person that the teaching of rod or shaft construction in the above arts may be effectively applied to other heavier, industrial or civil engineering uses as well.

Tapered, tubular composite rods require expensive, accurately ground metal mandrels to produce the taper necessary for the desired performance and there are considerable difficulties in manufacturing with uniform wall thickness. An attempt to overcome to some extent the problems associated with tubular rod manufacture from composite materials is the subject of U.S. Pat. Nos. 4,582,758 and 5,229,187 (referred to herein respectively as Bruce & Walker and McGinn), the enabling teaching of which are incorporated herein. Both patents relate to the provision of rods of polygonal cross-section formed by a plurality of elements of certain geometrical cross-section. Bruce & Walker describes that each of the elements has a base part of a fibre reinforced plastic material and an apex of part of a rigid plastic material foam.

McGinn, on the other hand, adopted a method of using T-sections made from fibre reinforced plastic material. The method by which the joints of the top ends of T-sections in McGinn are joined is shown in FIG. 5 of that patent. It is seen that the top ends of the T-sections must be molded or machined to a relatively small tolerance to accommodate matching of the several faces of the T-sections to each other. Both these rods, while they solve wall thickness variation problems and obviate the need for expensive mandrels for forming are difficult to make in the required thickness.

Bruce & Walker experience difficulties in the required stiffness for heavy load application such as are encountered in deep sea fishing and similar application without resorting to excessive composite wall thickness. The technology applied by McGinn addresses the stiffness required in heavy load application, but the mere nature of this technology reduces the ability to make the rods flexible for fly rod application in the various line weights required. Neither invention has adequately addressed the problem of torque encountered in small structures such as golf shafts.

The problem is severe in the case of Bruce & Walker. The McGinn technology has gone some way to addressing this problem with sufficient torque being removed from fishing rods to make them user acceptable. However, the problem of torque is highlighted when both products are used as golf shafts. Any torque in the shafts alters the angle of the golf club head when it comes in contact with the ball, which is unacceptable to the playing golfing public.

It is therefore one object of the present invention to provide a rod, shaft, etc., which obviates or at least minimizes the aforementioned disadvantages of conventional rods and those of Bruce & Walker and McGinn.

Erosion prevention and control systems are useful for minimizing erosion around underwater structures, including pipes, pilings, bridges and cables, that rely on the seabed for support and also for minimizing coastal shoreline and beach erosion, as well as retaining the finer silts and muds of wetlands. Methods and devices for preventing underwater bed and shoreline and wetlands erosion are known. Some of these devices, such as breakwaters and groynes, although relatively time intensive and expensive to install, are effective in minimizing shoreline erosion and are generally constructed from rock, concrete, rubble mounds and other hard body materials. Other devices, primarily used for erosion control on seabed structures, operate by increasing viscous drag on the underwater current, thereby reducing the velocity of the current and of the particulate transported by the current. This causes some of the particulate to settle out of the current and to be deposited in or around the erosion control system. The precipitated particles form a berm in and around the erosion control system. Typical of those devices that increase viscous drag on the current are buoyant frond elements or artificial seaweed or some other viscous drag element. The viscous drag elements are generally secured to the a silted surface (i.e., a seabed or riverbed) via some type of anchor line.

As the cross sections of the hydraulic passages in the viscous drag materials decrease, the amount of drag on the viscous drag elements increases. The structural strength of such materials must be increased to withstand the drag required which is sufficient to disrupt laminar flow of the silt bearing or erosion causing water flow. The ability of the viscous drag elements in prior art appear to rely on greater weight than necessary to obtain the desired sediment precipitation. However, these factors lead to the enhanced ability to build higher berms of precipitated particles. For coastal shoreline applications it is essential to have high berms which will form submerged, wide-crested breakwaters which, optimally, reach a height of 80% of the depth of the water. For wetlands sediment retention, the extremes of hurricane driven water flows to extremely low and constant velocity water flows must be accommodated to retain sediment.

With respect to sediment in having substantially the grain size of sand beaches, waves travel by pressure and move in an oscillating fashion to strike and wash across the beach surface. The forward and backward motions of the water, moving just above the bottom of the sea, are unsymmetrical, with the forward motion being stronger and of shorter duration than the backward motion. The carrying capacity for suspended solids in the moving water is generally proportional to the velocity of the flow. That velocity of flow can be regulated or influenced by environmental and/or man-made barriers. Thus, when the velocity of the flow is sufficiently reduced, deposition or precipitation of suspended solid matter occurs.

The best protection against shoreline erosion is a wide beach since that environment causes the waves to break, thereby dissipating the wave energy before the erosion of the shoreline can occur. Normally, beaches grow seaward by deposition of sand from longshore currents and new sand brought from offshore by the formation of a ridge and runnel system perpendicular to the beach. Long waves of small amplitude serve to replenish the shoreline, while short storm waves of high amplitude erode the shoreline.

Experience has shown that natural sandbars provide excellent protection against destructive wave forces. Consequently, attempts have been made to simulate sandbar action by constructing artificial barriers parallel to the shoreline. Such barriers have been unsuccessful because high velocity water currents typically scour and undermine their foundations, causing the barriers to fail and to lose their effectiveness.

SUMMARY OF THE INVENTION

The present invention is a general structural member assembly. Two embodiments of a basic structural unit of the present invention have two adjacent shafts, both further having a cross sectionally triangular shape with a longitudinal side completely or substantially mostly removed. The "open" side, i.e., the side completely or substantially mostly removed, in cross section presents two "leg" ends, i.e., the ends distal to the vertex of the longitudinal sides that at structurally intact and maintain the vertex of the two solid sides and such that the legs are approximately equal in length. The leg ends are formed or machined such that they present two outward surfaces generally parallel to the open face of a first adjacent shaft. The outward surfaces of the leg ends are then positionally fixed, albeit with some flexible movement in some embodiments, to generally have a parallel and longitudinal interface with the longitudinal outside edges of a solid side of a second shaft. Additional shafts may be added in this open side opposed to solid side basic assembly unit to form a single joined polygonal shaft assembly where all of the open sides are enclosed with a solid side, the additions proceeding in a circular fashion to form a polygonal cross section of exceptional strength and torsional resistance. Where a more extensive structure is desired, additional whole or partial sections of these joined polygonal shafts may be joined along one or more of their solid faces longitudinally along the solid faces of a first joined polygonal shaft, or portion thereof, at least preserving one basic structural unit of an open side positionally fixed to a closed side.

In the first of the two above embodiments, the open side completely lacks any portion of the longitudinal face of the triangular cross section of the adjacent shafts. The second of the two above embodiments comprises two short opposing extensions from the ends of the solid sides without such in the first embodiment, such that a short portion of the open side is formed along those legs to improve flexing strength.

In a third embodiment of a basic structural unit, two adjacent shafts also have open sides, a first adjacent shaft having solid sides and legs similar to those of the first embodiment except that an outside facing solid side has a cross section first length that is longer than that of the joined polygon enclosed solid side by about the thickness of a solid side. A second adjacent shaft also has an outside facing solid side of about the same cross section length and leg surface as that of the first adjacent leg. The joined polygon enclosed solid side of the second adjacent shaft also has the same length as its outside facing solid side, although it is further extended from its leg end in a direction such that the leg surface of the shortened leg of the first adjacent shaft presses in a force transmitting connection on an inside surface of the extension of the second adjacent shaft in an assembled arrangement as a basic structural unit. The assembled and combined cross section length of the shortened joined polygon enclosed solid side of the first adjacent shaft with the thickness of the extension of the joined polygon enclosed solid side of the second adjacent shaft then presents an outside surface of the extension as a leg surface effective with the leg surface of the outside facing solid side of the first adjacent shaft to then fixedly oppose the outside surface of a joined polygon enclosed solid side of another adjacent shaft such as that of the second adjacent shaft.

It is a further improvement of the present three basic structural units to provide single layer or laminar binding around the outside facing solid sides of a joined polygonal shaft assembly without any further securement, gluing, welding, bolting, soldering or the like between the adjacent shafts such that the adjacent shafts remain in positions sufficiently fixed to effect the support required of their application. This wrapped, un-secured embodiment is useful when sliding flexure of the adjacent shafts are desired, especially when a type of bending or twisting force is not so great as to break down the surrounding support.

It is a further improvement of the present three basic structural units to provide a single bonded axial connection to the central axis of the joined polygonal shafts, whereby the bonding may be accomplished with glues, expoxies, weld connections, solder or other methodologies (such as bolting and piercing/riveting methods) appropriate for securement of the central axis formed by the zone of leg ends of the joined polygon enclosed solid sides. Such joined polygonal shafts may then be bundled and secured together or with other longitudinal supports about their periphery such as described in the previous paragraph.

It is a further improvement of the present three basic structural units to provide bonding as described in the previous paragraph is provided only for the interface between the leg surface of the outside facing solid side and the abutting vertex zone of the joined polygon enclosed solid side of the adjacent shaft. A joined polygon shaft of this embodiment thus comprises an outer edge of longitudinally bonded adjacent shafts while leaving free for sliding movement the zone of leg ends of the joined polygon enclosed solid sides during flexing or torsional movement.

It is a further improvement of the present invention to combine the wrapping securement, central axis or outside facing seam bonding in combination with each other to obtain specific performance characteristics of flexing and torsional response. For example, the combination of a wrapping securement and the central axis bonding permits some slidable flexion in the interface between the leg surface of the outside facing solid side and the abutting vertex zone of the joined polygon enclosed solid side of the adjacent shaft while stiffening the overall structure with a non-bonding sleeve under the stiffening wrapping securement.

It is yet another embodiment of the present invention to form joined polygonal shafts with at least three or more sides. Any of the basic structural units are easily adapted to form joined polygonal shafts of any number of cross section outside solid sides so long as that number is three or more.

Additional inventive supports for the basic structural units comprise inserts into or fills for the void between the outer face of a joined polygon enclosed solid side of a first adjacent shaft and the inside faces of a the outside facing solid side and a joined polygon enclosed solid side of a second adjacent shaft, forming a longitudinal void with a roughly triangular shape. Longitudinal support inserts or fills into this void may have a cross section shape of a plane, triangle, circle (or oblate), separate solid rods, solid fill (urethane foam, epoxy, solder or metal), or fusible structurally supportive material. Appropriately smaller adjacent shafts of the present invention are also adaptable to be inserted alone or in a nesting relationship as longitudinal support for insertion into such a longitudinal void. Another class of inventive supports comprise planar inserts longitudinally interposed between and along the outer face of the joined polygon enclosed solid side of a first adjacent shaft and the leg surfaces of a second adjacent shaft. It has been found in prototype models of this planar insert embodiment that very thin, even flexible plastic material may comprise the basic structural unit while providing a planar insert bonded to the outer face of a joined polygon enclosed solid side that creates a joined polygon shaft of superior strength.

The basic structural units of the present invention may be used in such a wide number of applications that the types of additional supports described in the preceding paragraph may be applied separately or in combination along the length of any single longitudinal void. For example, in an antenna, ship mast or hull, or building joist where variable strength, flexibility and resistance to torsion may be desirable, a nested set of smaller adjacent shafts in one section of the longitudinal void may be easily reduced to an identical set of such supports less the innermost nested adjacent support shaft.

Figures 7, 8, 9, 10:
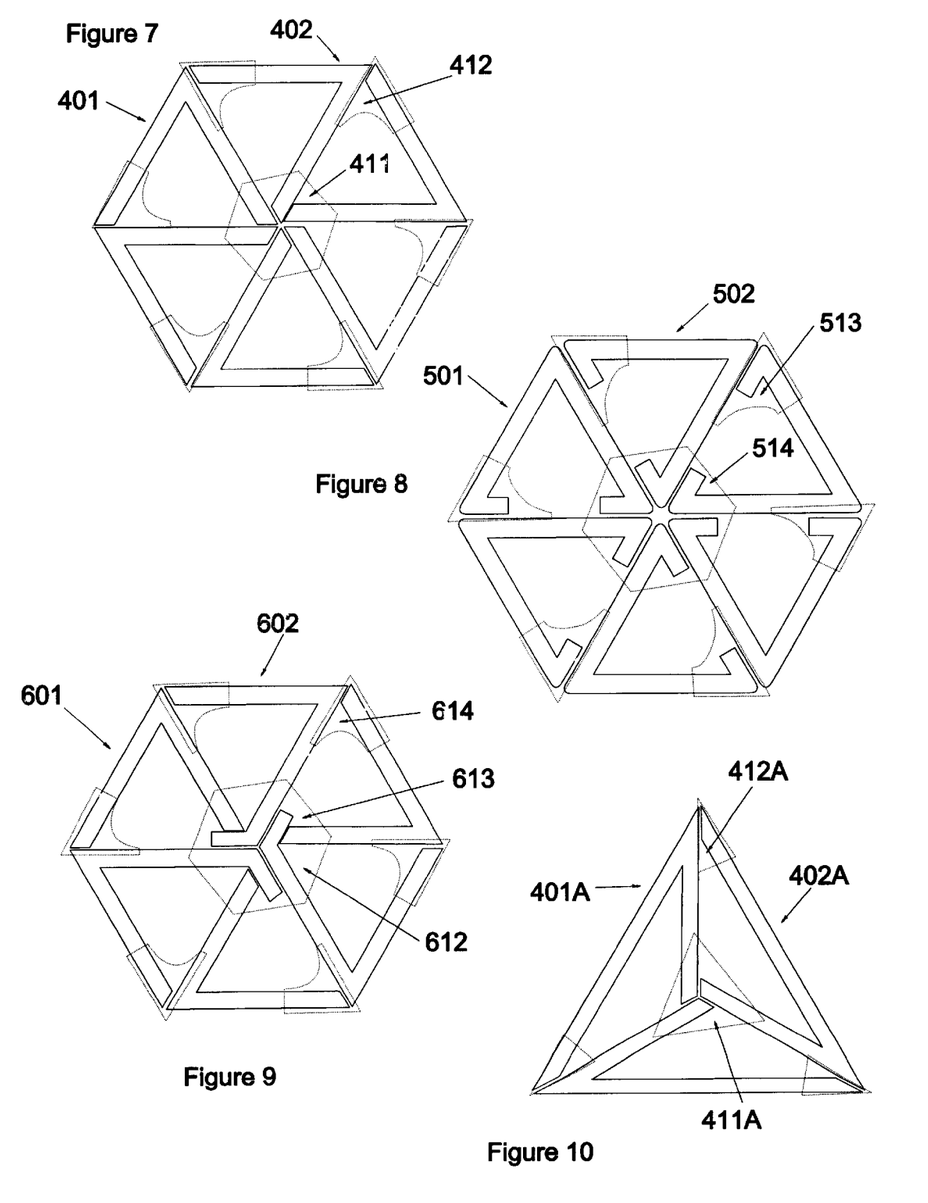
FIG. 7 is a joined polygonal shaft of the first embodiment of the basic structural unit of the present invention with a hexagonal circumferential shape.
FIG. 8 is a joined polygonal shaft of the second embodiment of the basic structural unit of the present invention.
FIG. 9 is a joined polygonal shaft of the third embodiment of the basic structural unit of the present invention.
FIG. 10 is a joined polygonal shaft of the first embodiment of the basic structural unit of the present invention with a triangular circumferential shape.

In an embodiment using the structural member of the invention in an assembly for soil or sediment retention and accumulation, the structural member of FIG. 8 comprises a lattice type material, preferably a swaged or expanded metal grating. Such metal grating is well known in the art for supporting persons or similar loads. It is known that such grating is often specified with respect to the grate opening formed on expansion of a slotted metal sheet. The grate openings intended for use in this embodiment are from ¼ inch to 2 inches, and more preferably from about ½ inch to 1 inch. Upon first consideration, the open, apparently non-sediment retaining structure of the swaged or expanded metal grating would cause the skilled person to disregard such materials for sediment retention or accumulation. However, the mere skilled person does not have the benefit of knowledge of the present structural member as shown in FIG. 8. The structural member of FIG. 8 of this embodiment is optimally joined horizontally side by side with other such members to form a first layer and may receive on its upper side and in parallel relationship to the first layer a second or greater number of layers of such structural members, thereby creating a sediment retaining or accumulating stacked assembly. It is preferred that the stacked assembly be anchored in any of several methods for securing the stacked assembly such that it will generally lie with its structural members normal to the flow of water across a sediment surface, i.e., if on a beach, the structural members would generally be parallel with the coastline at that location. Such anchoring comprises methods such at securing each end of the stacked assembly with a rope or ropes or chain or chains to single or multiple posts driven into the subsurface sufficiently deep to maintain the desired relationship of the stacked assembly to the water flow through the several types of wind and weather to which the sediment surface is exposed. The stacked assembly has proven effective in causing precipitation and capture of sand and sediment from ocean waves sufficient to cause berm formation on an open beach. Such a result is highly surprising in light of the teaching in the prior art to form substantial wall structures to reach substantial heights or height limited structures of lesser bulk. The present invention permits formation of a stacked assembly with almost no height limit, as the structural strength contributed by the structural members permits the relatively open frame structure of the swaged or expanded grating. In a specific experiment, a structural member was formed with an element cross section side of about 6 inches and using a ½ inch swaged metal grate to form all the elements of the structural member as in FIG. 8. A single layer of the structural members was subjected to a water flow from a 3 inch fire hose supplied from a typical water main—the single layer prevented any pressurized water flow from passing to the other side of the single layer. The swaged metal grating provides twisted surfaces on the grating forcing laminar flow into locally turbulent regions that then impinge on each other without requiring wide and substantial surface area that the skilled person would expect to be required for obtaining the objects of this stacked assembly embodiment.

DESCRIPTION OF THE INVENTION

According to the present invention, there is provided a rod comprising a plurality of elongated V section elements wherein the open end of the V section element is joined to one leg of the adjacent V section elements. The other leg of the V section element forms the outer surface of the polygonal shape. The extremities of the inner leg of the V section element extend in a direction towards a common axis.

Practical consideration in rod construction will generally limit the number of V section elements to 12 and most preferably to 6. Hexagonal structures are the most preferred.

The elongate V section elements may have parallel or tapered edges depending on the particular end use to which the rod, shaft etc. is to be put. The V section elements may be fabricated from a wide range of materials, the preferred materials being those which provide maximum longitudinal stiffness and have low weight. Particularly suitable materials are fibre reinforced plastics materials such glass, carbon, polyimide and boron fibre in admixture with polyester, epoxy, phenol and thermoplastic resins. Metals such as aluminum, brass, titanium and fibre reinforced metals, and metal composites such as fibre reinforced aluminum and silicon carbide filled magnesium, are also useful are anisotropic polymers such as liquid crystal polymers.

In constructing the rod, it is not necessary for all the elongated V section elements to be fabricated from the same material and, in fact, it can be advantageous in certain circumstances to use different materials having different mechanical properties. Thus, in the case where the rod is to be placed under load in only one bending direction, elongate V section elements of high compressive strength may he employed on the inside of the curve and elements of high tensile strength may be employed on the outside of the curve. This will minimize the weight of the rod shaft etc. and the quantity of materials required to produce a particular stiffness or action.

Additional strength characteristics may be provided by filling one or more of the cavities within the rod with one or more suitable fillers. Preferred fillers include expanded structural foams such as polyurethanes, polyvinylchloride, polyimide, polystyrenes and composites such as resinous mixtures of glass bubbles and microspheres, silicates, carbonates, chopped strand fibres and fibre whiskers. The filler may be placed into the cavities after the V section elements have been joined together or into the space between the legs of the V section element prior to joining.

To form a polygonal structure of 6 sides, a combination of 6 accurately machined composite V section elements and extending the full Length of the element: The V section elements are glued together lengthwise with the open end of the V section element glued to one of the legs of the adjacent V section element with the apex of the V section element facing outwards.

An outer fibre/resin composite skin is then added by tape winding or filament winding or composite cloth wrapping around the tapered rod formed from the V section elements to give a structure similar to that above. Further strengthening of the hexagonal structure can be achieved by gluing a similar angled shaped object into the triangular hollows having the apex of this structure covering the outermost joint of the V section element. One leg of the structure being glued to the surface of the inner leg of the adjacent V section element. The other of the structure is glued to the inner surface of the V section element that forms the outer surface. These V shaped reinforcing structures can be of composite material, or aluminum, brass, steel or expanded structural foam etc.

The jointing together of the elongate V section elements may be achieved by the use of an adhesive which is compatible with the materials of the element; for instance, epoxy resin, or, in the case of some thermoplastics by the use of ultrasonic welding.

Figure 1:
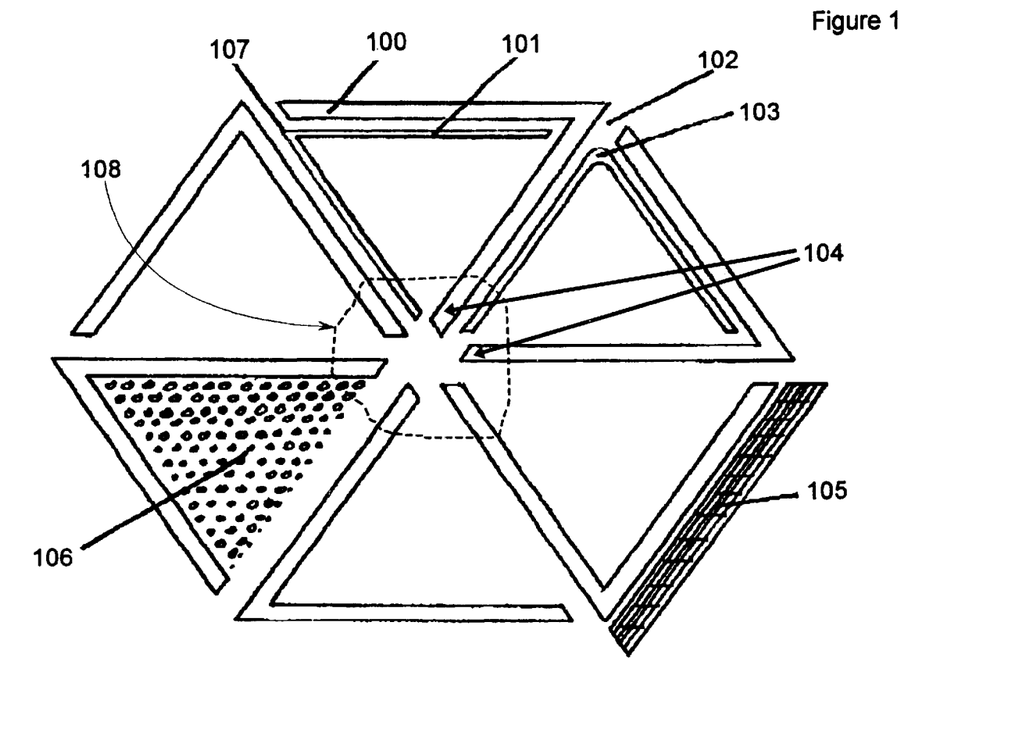
FIG. 1 is a somewhat exploded cross-sectional view of the rod of the present invention, wherefore V sections and reinforcing V sections are shown in unsecured relationship.
Figure 2:
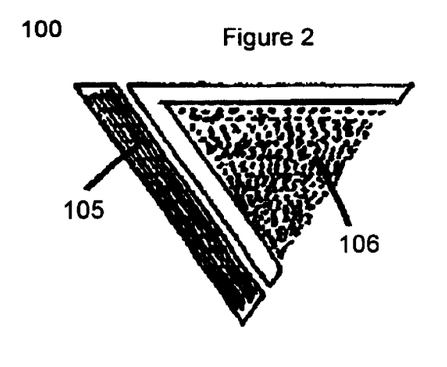
FIG. 2 is a closer view of the V trough point of a V section, wherein the V section is filled with strengthening filler, as described below, and an exterior surface is shown with supporting laminates to be arranged in wrapping support about the assembled V sections.
Figure 3:
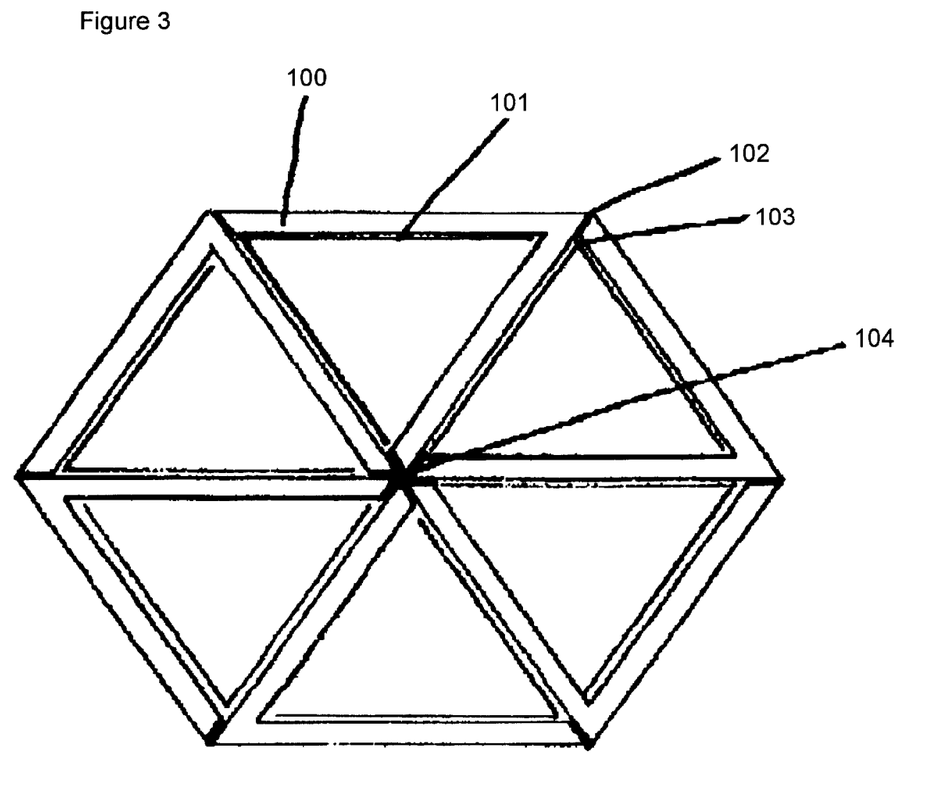
FIG. 3 is the assembled and secured cross-sectional view of the V sections and reinforcing V-sections shown in FIG. 1.

The present invention is now described with respect to the above Figures. In FIGS. 1, 2 and 3, accurately machined elongate V section element 100 may be fabricated from a wide range of materials such as fibre reinforced plastics which include glass, carbon, polyimide and boron fibre in admixture with polyester, epoxy, phenol or thermoplastic resins.

In FIGS. 1 and 3 are shown accurately machined elongate V section reinforcing element 101 fabricated from composite material or metal, such as brass, aluminum, steel, titanium and metal composites, bonded to inside of outer leg of elongate V section element and to the outer surface of the inner leg of the adjacent V section element, so that the reinforcing V section element covers the glued joint 102. The radius 103 of reinforced V section structure 101 can be sharp or rounded depending on design and performance of product. The inner leg ends 104 of the elongate V sections 100 are intended to be glued or likewise secured together generally in axial securing zone 108. FIG. 3 shows such securing. Extra laminates 105 of compatible material may be added to the outer surface of the V section element 100 depending on the requirements of the product. Cavity fill 106 materials comprise expanded structural foam, polyurethanes, polyvinylchloride, polyimide, polystyrenes and composites such as resinous mixtures of glass bubbles and microspheres, silicates, chopped stressed fibres and fibre whiskers.

Tape winding or filament winding around structure is not shown in full detail. The skilled person is informed by the disclosure herein of the advantages of that application.

Figure 4:
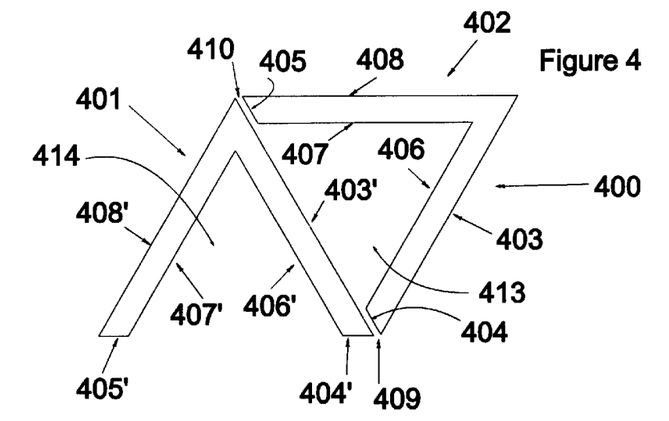
FIG. 4 is a first embodiment of the basic structural unit of the present invention.

The present invention is now discussed with reference to the figures, whose reference numbers indicate substantially similar aspects of the figure when the same reference number is used in separate figures. With reference to FIG. 4, a first embodiment of the basic structural unit 400 is shown in cross section comprising a first adjacent shaft 401 and second adjacent shaft 402. Shaft 401 comprises:

inner face 407' of an outside facing solid side,
outer face 408' of an outside facing solid side,
inner face 406' of a joined polygon enclosed solid side,
outer face 403' of a joined polygon enclosed solid side,
leg surface 404' of a joined polygon enclosed solid side,
leg surface 405' of a an outside facing solid side, and
longitudinal void 414.

Shaft 402 comprises:
inner face 407 of an outside facing solid side,
outer face 408 of an outside facing solid side,
inner face 406 of a joined polygon enclosed solid side,
outer face 403 of a joined polygon enclosed solid side,
leg surface 404 of a joined polygon enclosed solid side,
leg surface 405 of an outside facing solid side, and
longitudinal void 413.

Leg surfaces 404 and 405 are shown to be adapted to be roughly parallel with an outer face 403', thereby having between them spaces 409 and 410 respectively. Spaces 409 and 410 are optionally separately bondingly closed as described in one of the several manners described in the Summary of the Invention. The leg surfaces of this first embodiment are preferably formed or machined to achieve an edge or face appropriate for force transmitting contact the outer face 403' of the joined polygon enclosed solid side. This force transmitting abutment or connection is critical to the present invention.

Figure 5:
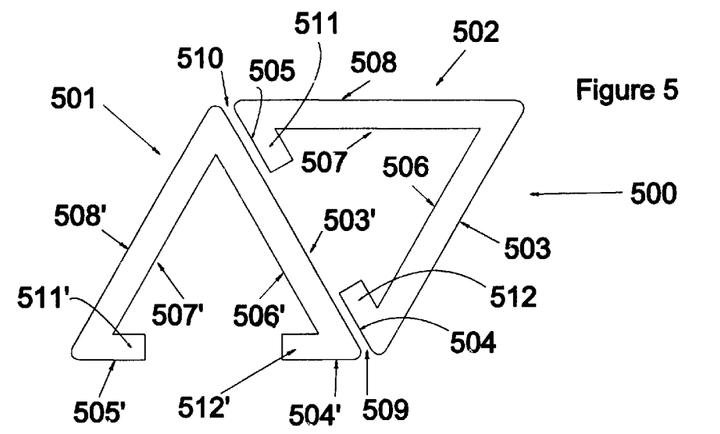
FIG. 5 is a second embodiment of the basic structural unit of the present invention.

With reference to FIG. 5, a second embodiment of the basic structural unit 500 is shown in cross section comprising a first adjacent shaft 501 and second adjacent shaft 502. Shaft 501 comprises:

inner face 507' of an outside facing solid side,
outer face 508' of an outside facing solid side,
inner face 506' of a joined polygon enclosed solid side,
outer face 503' of a joined polygon enclosed solid side,
leg surface 504' of a joined polygon enclosed solid side,
leg surface 505' of an outside facing solid side,
leg extension 511' of an outside facing solid side, and
leg extension 512' of a joined polygon enclosed solid side.

Shaft 502 comprises:
inner face 507 of an outside facing solid side,
outer face 508 of an outside facing solid side,
inner face 506 of a joined polygon enclosed solid side,
outer face 503 of a joined polygon enclosed solid side,
leg surface 504 of a joined polygon enclosed solid side,
leg surface 505 of an outside facing solid side,
leg extension 511 of an outside facing solid side, and
leg extension 512 of a joined polygon enclosed solid side.

Leg surface 605 is shown to be adapted to be roughly parallel with an outer face 603', thereby having between them space 610. Leg surface 604 is shown to be adapted to be roughly parallel with an leg surface 604', thereby having between them space 609. Shaft 601 has a joined polygon encloses solid side shorter than its outside facing solid side by about the thickness of leg extension 611. Spaces 609 and 610 are optionally separately bondingly closed as described in one of the several manners described in the Summary of the Invention. The presentation of leg surface 609' has a parallel form the force transmitting equivalent of leg surface 404' of FIG. 4.

Figure 6:
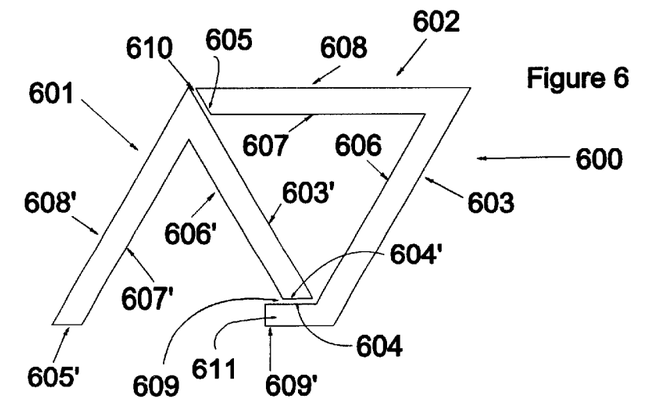
FIG. 6 is a third embodiment of the basic structural unit of the present invention.

With reference to FIG. 6, a third embodiment of the basic structural unit 600 is shown in cross section comprising a first adjacent shaft 601 and second adjacent shaft 602. Shaft 601 comprises:

inner face 607' of an outside facing solid side,
outer face 608' of an outside facing solid side,
inner face 606' of a joined polygon enclosed solid side,
outer face 603' of a joined polygon enclosed solid side,
leg surface 604' of a joined polygon enclosed solid side, and
leg surface 605' of an outside facing solid side.

Shaft 602 comprises:
inner face 607 of an outside facing solid side,
outer face 608 of an outside facing solid side,
inner face 606 of a joined polygon enclosed solid side,
outer face 603 of a joined polygon enclosed solid side,
leg surface 604 of an inside face of leg extension 611,
leg surface 605 of an outside facing solid side,
leg surface 609' of leg extension 611, and
leg extension 611 of a joined polygon enclosed solid side.

Leg surface 605 is shown to be adapted to be roughly parallel with an outer face 603', thereby having between them space 610. Leg surface 604 is shown to be adapted to be roughly parallel with an leg surface 604', thereby having between them space 609. Shaft 601 has a joined polygon encloses solid side shorter than its outside facing solid side by about the thickness of leg extension 611. Spaces 609 and 610 are optionally separately bondingly closed as described in one of the several manners described in the Summary of the Invention. The presentation of leg surface 609' has a parallel form as the force transmitting equivalent of leg surface 404' of FIG. 4.

It is clear from this disclosure that the bending and twisting forces on the basic structural unit of this third embodiment will be distributed substantially differently than those of the first embodiment. In a twisting motion, of the first embodiment spaces 409 or 410, one space will tend to compress and the other will tend to separate. With the third embodiment in a twisting motion, of the third embodiment spaces 609 or 610, when space 610 tends to compress, space 611 will also tend to compress. Alternately, when space 609 tends to separate, space 610 will tend to remain about the same with the abutment of the shorter solid side end against the vertex of the adjacent shaft solid side and leg extension.

With the above disclosure, it will apparent that the embodiments of the basic structural units of the present invention may be advantageously abutted against each other to obtain a larger variety of flexural characteristics. For example, outer face 403 may be joined against leg surfaces 605' and 609' of FIG. 6 to continue the circular build-up of the basic structural units into a joined polygonal shaft. FIGS. 7–10 show just such circular build-up assemblies.

FIG. 7 shows the shafts 401 and 402 of a unit 400 duplicated three times and continued in a circular build-up method to provide a single joined polygon shaft. Central axis bonding zone 411 shows a preferable zone in which to provide one of the methods of bonding together the free ends of the joined polygon enclosed solid sides. Outside seam bonding zone 412 shows a preferable zone in which to provide one of the methods of bonding together the leg surface of the outside facing solid side and the abutting vertex zone of the joined polygon enclosed solid side of the adjacent shaft.

FIG. 8 shows the shafts 501 and 502 of a unit 500 duplicated three times and continued in a circular build-up method to provide a single joined polygon shaft. Central axis bonding zone 514 shows a preferable zone in which to provide one of the methods of bonding together the free ends of the joined polygon enclosed solid sides. Outside seam bonding zone 513 shows a preferable zone in which to provide one of the methods of bonding together the leg surface of the outside facing solid side and the abutting vertex zone of the joined polygon enclosed solid side of the adjacent shaft. It is seen in the figures that the preferred second embodiment comprises filleting of at least the edges of the outer faces of the adjacent shafts. Where heavier materials, such as metals, alloys and reaction settable or heat formable sheets of polymers are used or where machining is preferably to be avoided on the leg surfaces, the forming or bending processes preferably leave filleted edges to improve the ease of fabrication and bonding. The outside face seams between the adjacent shafts present an area to which welded connections are more easily made. Zone 514 edge filleting creates a central void into which may be forced adhesive bonding means with reaction or heat setting action.

FIG. 9 shows the shafts 601 and 602 of a unit 600 duplicated three times and continued in a circular build-up method to provide a single joined polygon shaft. Central axis bonding zones 612 and 613 show a preferable zone in which to provide one of the methods of bonding together the free ends of the joined polygon enclosed solid sides. Outside seam bonding zone 614 shows a preferable zone in which to provide one of the methods of bonding together the leg surface of the outside facing solid side and the abutting vertex zone of the joined polygon enclosed solid side of the adjacent shaft.

FIG. 10 is an alternate embodiment of this first embodiment with a joined polygonal shaft comprising adjacent shafts 401A and 402A. Central axis bonding zone 411A shows a preferable zone in which to provide one of the methods of bonding together the free ends of the joined polygon enclosed solid sides. Outside seam bonding zone 412A shows a preferable zone in which to provide one of the methods of bonding together the leg surface of the outside facing solid side and the abutting vertex zone of the joined polygon enclosed solid side of the adjacent shaft.

It will be seen that joined polygonal shafts, as opposed to basic structural units, experience compression of, for example, space 410 shown in FIG. 1, regardless of the rotation of twisting force. In some embodiments, It is preferable to provide a more elastic and flexible bonding means for the central axis bonding zones than the outside seam bonding zones so that during twisting motion the free ends of the joined polygon enclosed sides may radially slightly expand without rupturing the bonding means while the bonding on the outside seam bonding zones is simple compressed.

Figure 11:
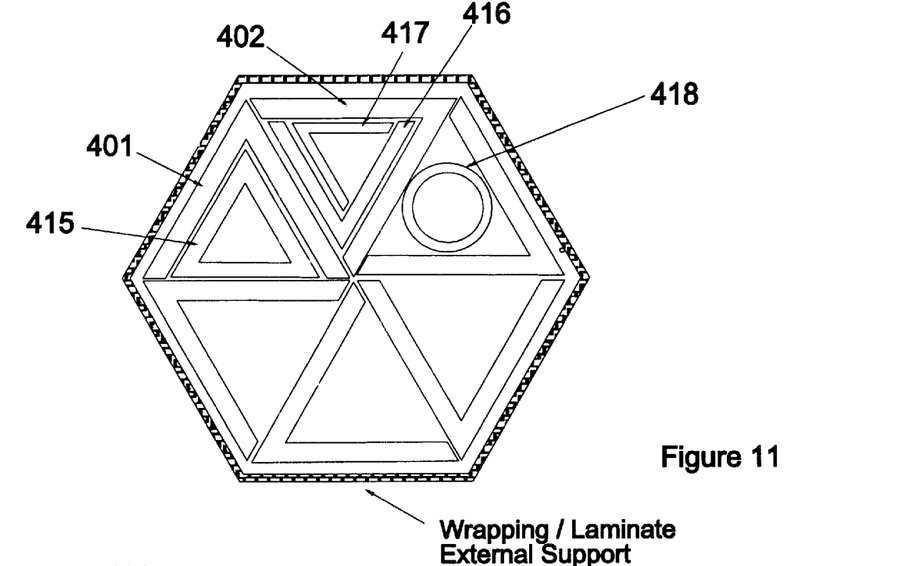
FIG. 11 is a joined polygonal shaft of the first embodiment of the basic structural unit of the present invention with a hexagonal circumferential shape and further showing longitudinal insert supports for the longitudinal void.
Figure 12:
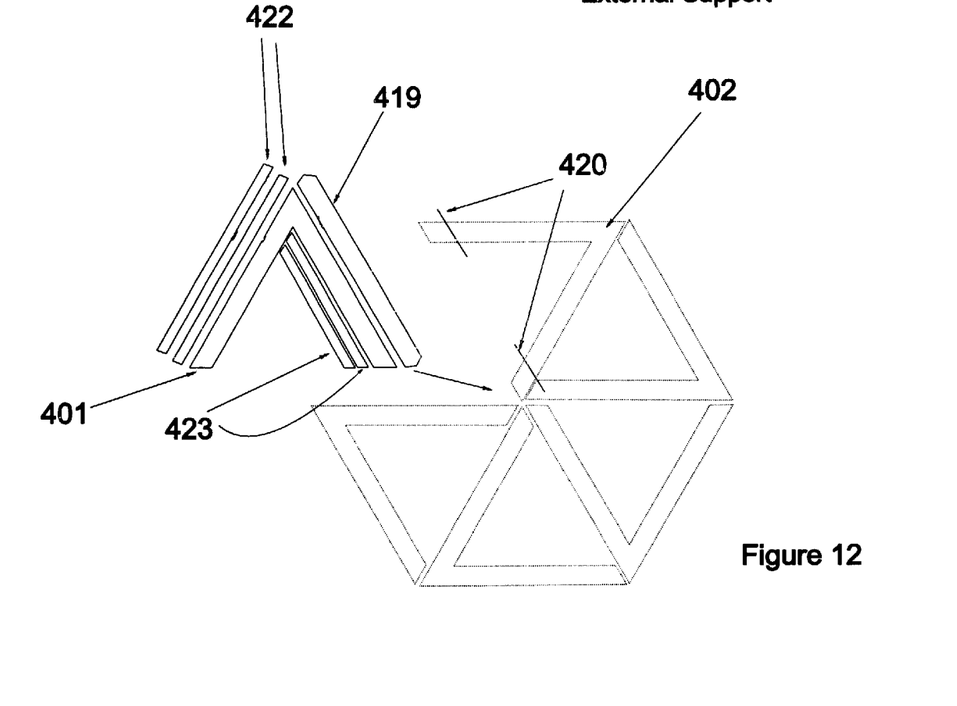
FIG. 12 is a joined polygonal shaft of the first embodiment of the basic structural unit of the present invention with a hexagonal circumferential shape, whereby an adjacent shaft is withdrawn to illustrate the positioning of planar longitudinal supports that may be effectively applied about the inner and outer faces of an adjacent shaft.

In FIG. 12 are shown some of the several types of support means insertable into the longitudinal voids, such as voids 413 and 414 of the basic structural unit. Triangular support 415 and circular support 418 are shown in external side contact with the inside faces of a first adjacent shaft and the outside face of the joined polygon enclosed solid side. First and second nested adjacent shafts 416 and 417 are shown nested within the inside faces of the adjacent shafts of the first embodiment. Shaft 416 is shown and preferably has a solid side fully contact and engage at least an inside face of a first adjacent shaft and the outside face of the joined polygon enclosed solid side of a second adjacent shaft. Shaft 417 is preferably nested such that a solid side engages and fully contacts the remaining open inside face of the first adjacent shaft. The potential of additional nesting of smaller shafts of the types shown in this FIG. 11 will be apparent with this description.

FIG. 12 shows three embodiments of planar supports to an adjacent shaft of the first embodiment of the present invention. Inter-adjacent shaft planar insert 419 is adapted to be held fixed in spaces 409 and 410, as those spaces are shown in FIG. 1, thus requiring a shortening 420 of the solid sides of adjacent shaft 402 to accommodate the insert thickness. Longitudinal void planar inserts 423 preferably abut just below the vertex on the inside face of an outside facing solid side of a first adjacent shaft and extend to abut at the other edge of the insert against the outer face of a joined polygon enclosed solid side of a second adjacent shaft immediately adjacent to the inside edge of the leg surface of the joined polygon enclosed solid side of the first adjacent shaft. An insert 423 extends the effective thickness of a joined polygon enclosed solid side with respect to force transmission from one adjacent shaft to another. External planar supports 422 preferably lie just above the outer face of the outside facing solid side of an adjacent shaft. Supports 422 provide greatest additional resistance to bending against bending in the direction parallel to the face of supports 422.

Figure 13:
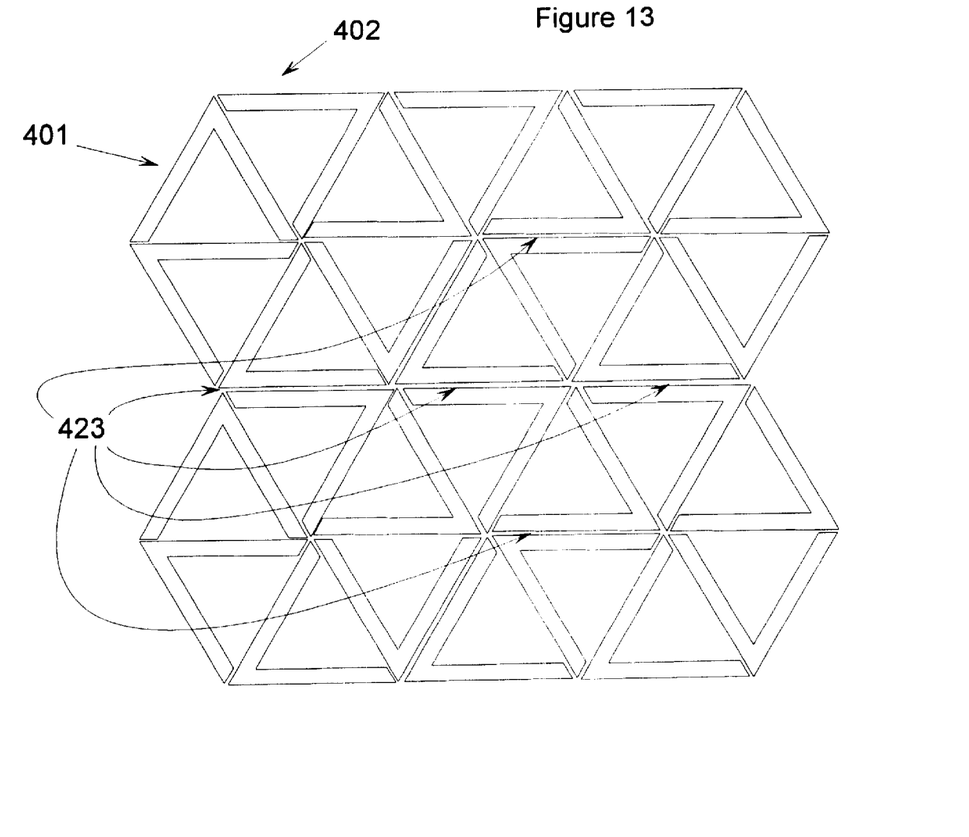
FIG. 13 is a set of joined polygonal shafts of the first embodiment of the basic structural unit of the present invention with a hexagonal circumferential shape forming an enlarged structural member.

Basic structural unit 400 with shafts 401 and 402 is shown multiplied in an enlarged structure in FIG. 13. Space 424 indicate spaces in which the outside faces of solid sides longitudinally must abut with a minimum frequency to increase the size of several assembled basic structural units above the cross section size of a joined polygonal shaft, which has no such abutments. The wide distribution of compression, bending and twisting forces into such a structure provides a strong and lightweight structure.

Figure 14:
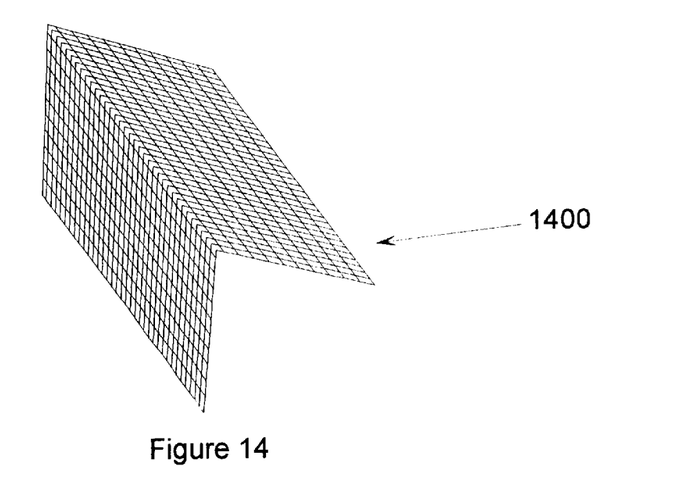
FIG. 14 is an upper front view of a weld mesh formed as the first embodiment of the present invention.
Figure 15:
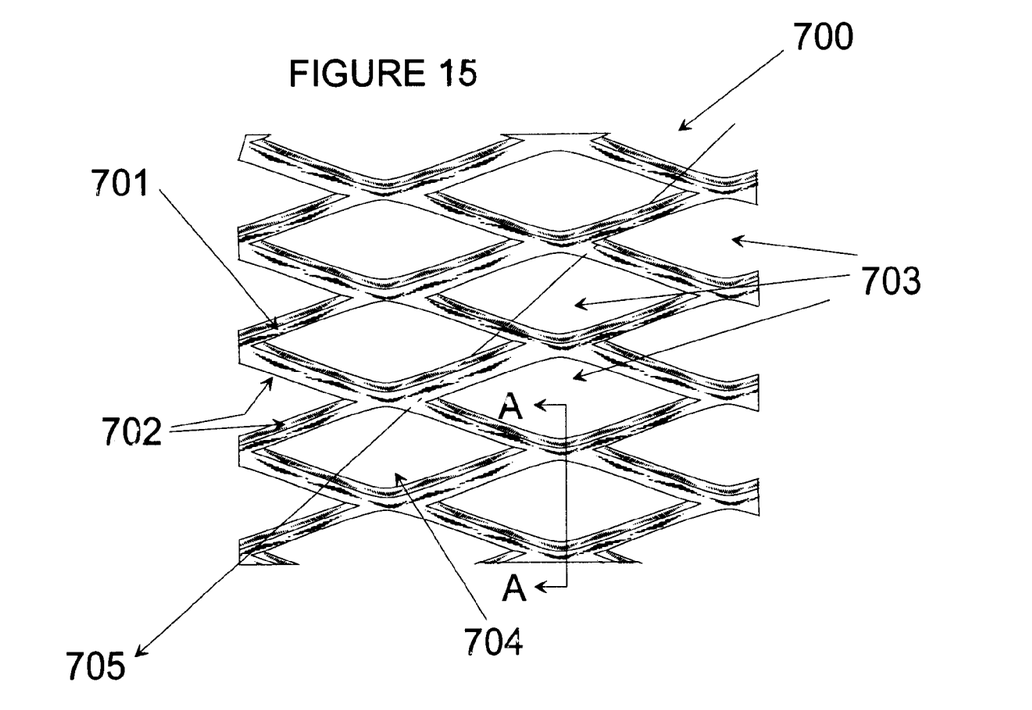
FIG. 15 is a close up top view of a swaged or expanded metal grating as an example of the several types of such grating commercially available.

The composition of the solid sides and insert means is limited only to those materials, alloys, composites and the like with sufficient longitudinal strength such that the skilled person would obtain with the above description effective resistance to bending, lateral compression and twisting within the temperature range required for effective operation of a device incorporating the basic structural unit of the present invention. It is another embodiment of the present invention that the composition of the solid sides and/or insert means comprise a high tensile strength weld mesh, effective for fabricating structures according to the present invention with a length of up to several hundred feet. FIG. 14 shows a first embodiment weld mesh 1400 whose resulting longitudinal void may appropriately be filled with structural carbon foam, and whose free ends may be extended in a manner to achieve adjacent shaft cross section shapes of the second and third embodiments.

It will be understood that the solid sides of the present invention are effectively so fabricated. Such adaptations as longitudinal, lateral or slanted slots, perforations, access openings and the like may be provided in the longitudinal surface of the solid surfaces of the present invention, albeit only to the extent that a desired flexural, compression or torsional characteristic is not substantively impaired by such piercings of the solid sides.

Stacked Assembly Embodiment

Figure 16:
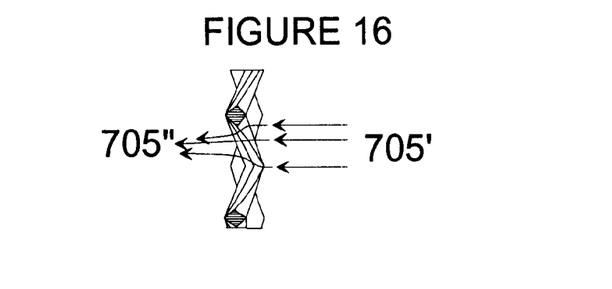
FIG. 16 is a cross section AA of FIG. 15

The present invention is now discussed with reference to FIGS. 8 and 15–20. A structural member as in FIG. 8 preferably comprises elements formed substantially from a relatively open metal grating, more preferably from a swaged or expanded metal grating 700 as in FIG. 15. Grating 700 comprises a uniquely twisted arrangement of relatively slender and generally square metal shafts joined without welds or other mechanical connection, the openings 703 of the grating being formed from expansion of a slotted single sheet of metal. The method of expansion forms twists with an inside surface 702 and an outside surface 703. This twisting is especially effective for breaking up laminar flow 705 in FIG. 15 as it passes through the opening 704. FIG. 16 shows an exemplary laminar flow 705' having its flow lines diverted into impingement flow 705" in flowing across the cross members of the grating.

In an alternate embodiment of the present stacked assembly invention, the grating in its several intended forms is formed from polymers. The polymer grating is preferably a polyethylene or equivalent polyolefin or a PET or its equivalent having minimal proven environmental impact in the present invention. Such a polymer grating may be of solid and substantially rigid polymer or may be formed as a rigid skin about a structural foam core, the foam core having substantially the polymer composition of the skin. The structural foam embodiment preferably comprises a rigid polymer skin of about 0.75–1.5 millimeters thickness with an overall thickness of about 2–4 millimeters. The method of forming the grating may be by extrusion, injection molding or specialty calendaring whereby the structural foam portion is encased in the rigid polymer skin. The methods of forming the polymer grating will allow the designer to obtain the twist effects of the swaged metal grating or its equivalent.

Figure 17:
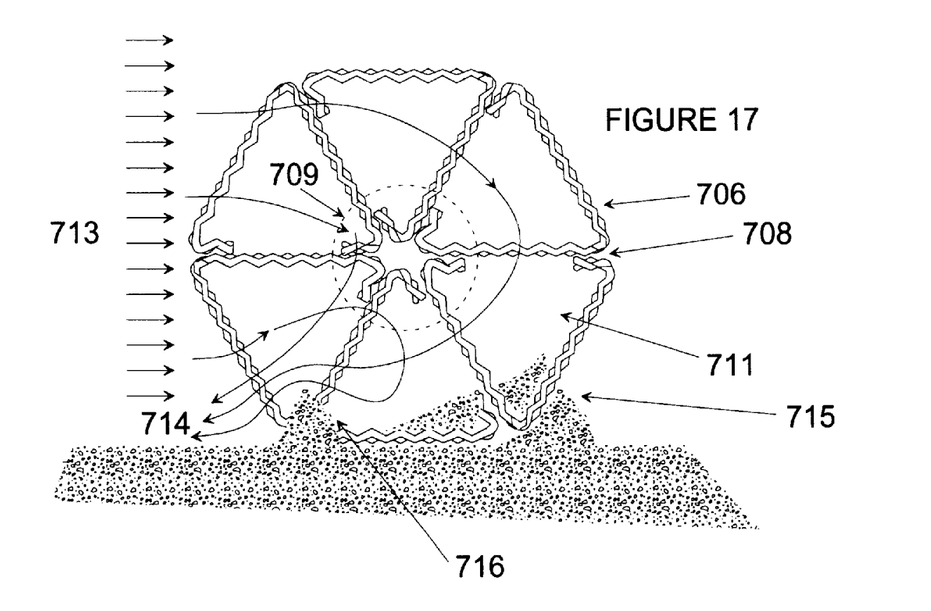
FIG. 17 is an end view of a single structural member comprised of swaged metal grating in an embodiment as in FIG. 8 and shown accumulating sediment from a water sediment wave motion.

FIG. 17 shows an end view of a structural member for the stacked assembly. The structural member of FIG. 8 is shown as structural member 706 consisting of six swaged metal grating elements. This preferred embodiment shows the structural member comprising six joined elements, although more or as few as three (depending on the effective hydraulic cross section of the grating and the effective cross section diameter of the structural element) joined elements will combine to provide sediment retention or accumulation under some conditions. The member 706 has an equilateral element side length of about 6 inches in a specifically tested embodiment, although that length may range from about 3 inches to about 24 inches. The joining means between the elements of member 706 are not shown, but may be accomplished at interface regions 708 and 709 by the methods described above for the structural member of FIG. 8.

Figure 17A:
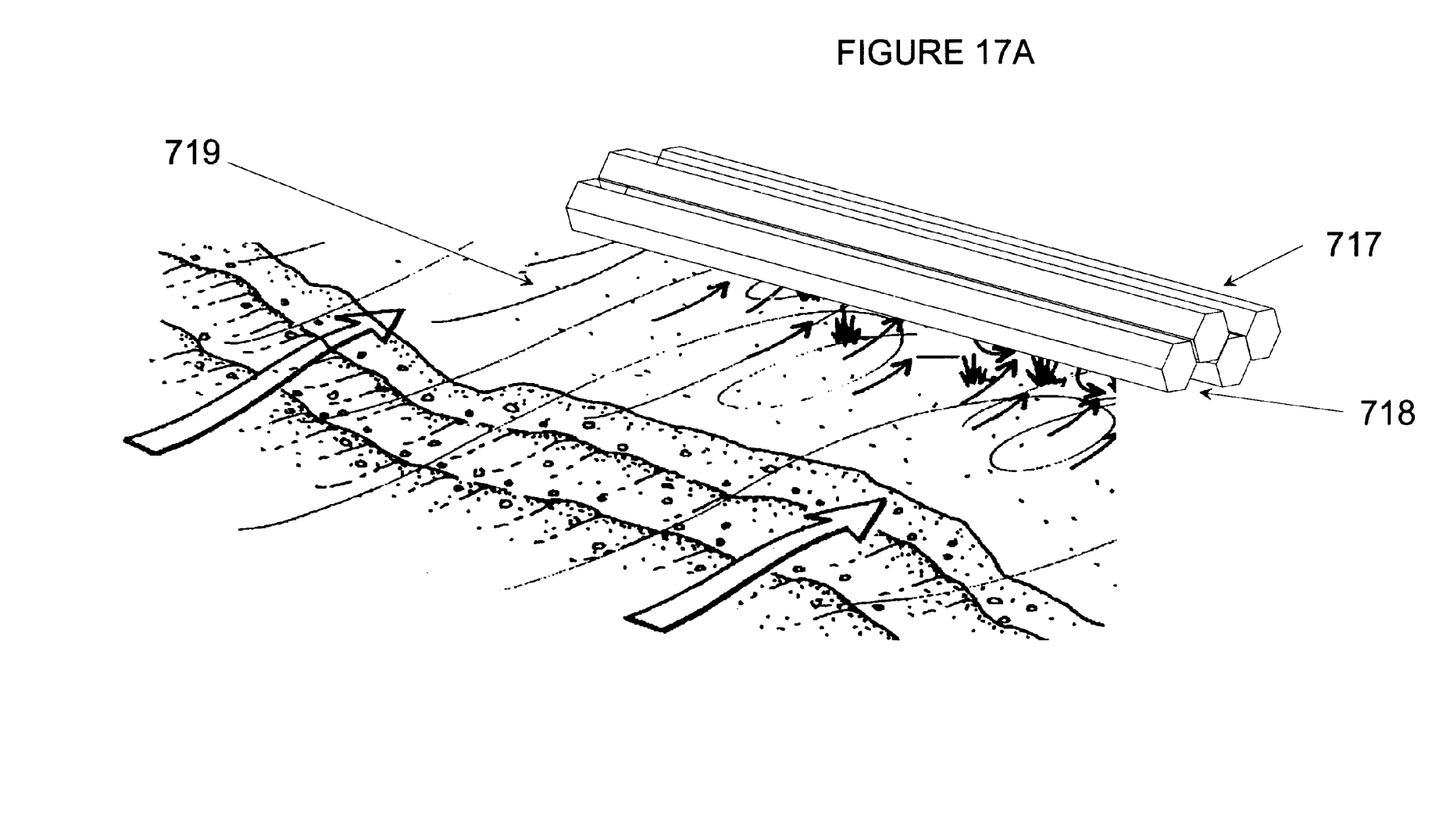
FIG. 17A shows a two-layer stacked assembly according to the present invention in a preferred arrangement on a beach with the structural members lying generally normal to the wave action of the ocean.
Figure 19:
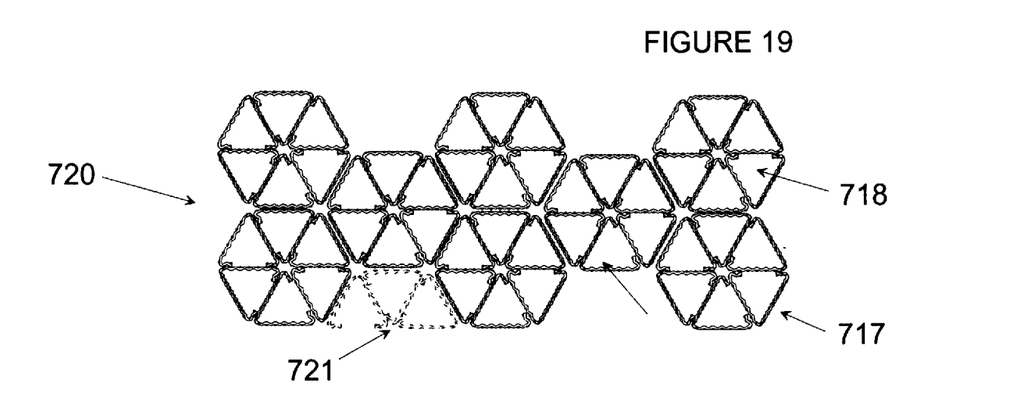
FIG. 19 is a two layer embodiment of the present invention where the bottom of the structural members of the first layer present a flat, parallel contact to the sediment surface on which they will rest.

Sediment bearing water flow 713 is shown directed to a front face of member 706 in a laminar flow for consideration of its passage into, deposition of at least a portion of the sediment within the interior space 711 of member 706, and eventual passage of the reduced sediment flow 714 from the member 706. Member 706 is effective at stopping forward wave force and water volume and minimizing the backflow of a wave action, thereby causing berm sediment accumulation most significantly in region 715 and additionally in region 716. The easier passage of the water through the hydraulic openings of the grating than the sediment causes the sediment to accumulate in the turbulent flow in space 711 as the water passes through the outer wall of member 706 and returns to the wave source. The effectiveness of this member 706 has been shown in a demonstration project on a San Francisco bay beach with berm formation within a matter of weeks. FIG. 17A shows a typical sand beach having installed on it a two layer, flat bottomed embodiment of the stacked assembly 717 of four members 706, although this Figure is intended to show a generalized relationship of the stacked assembly to the wave action of a sediment bearing flow of liquid. The assembly 717 may comprise members 706 from about 5 feet to 30 feet long, although more preferably from about 8 feet to 10 feet long. Members 706 in the stacked assembly may be joined by welding, binding, adhesive or other such connection as required by the environment. As shown in FIG. 19, the two layer, flat bottomed embodiment 720 shown generally in FIG. 17A comprises a first layer 717 and a second layer 718. A complementing layer in the horizontal orientation of layer 717 may be fixed to the top of layer 718, and another layer affixed above that and so on. The half structural member 721 shown in broken lines may be used to support the first layer 717 on a sediment surface. The stacked assembly of the present invention comprises the benefit of creating a relatively light, albeit not sufficiently buoyant to be floated from its anchored position, structure for retaining and accumulating sediment which is not so heavy so as to prevent stacking to substantial heights.

An alternate embodiment is to use a single layer of members 706 on a sediment surface. Another two layer embodiment 729 is shown in FIG. 18 with first layer 730 arranged so that members 706 comprising that layer are secured together so that a wide V-shape is pressed into the sediment surface by the first layer 730, having joined above and to it layer 731.

Figure 20:
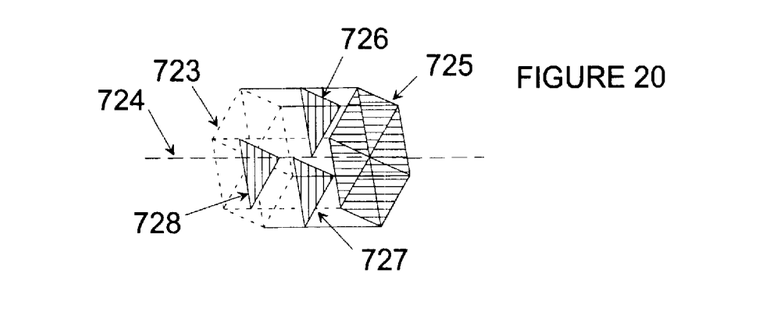
FIG. 20 is a general outline of the structural member of the stacked assembly including full and partial, staggered solid baffles adapted to lie generally parallel to the flow of a sediment bearing liquid.

FIG. 20 shows a generalized hexagonal cross sectional outline 723 of a member 706 with a centerline 724, whereby are shown exemplary solid baffles made of metal or rigid polymers and secured within space 711 generally parallel to liquid flow before it strikes the stacked assembly. A full cross sectional baffle 725 may be used to block liquid and sediment flow from one section of a member 706 to another section divided thereby. Alternately, element baffles 726 can be fixed within an element of member 706 such that the open core of the triangular cross section of the element is blocked. Such baffles accomplish water flow constraint when the water flow changes from its general delivery direction to a less normal angle of strike at the stacked assembly. Such baffles are also useful for support and may permit reduced grating thickness which in turn reduces costs.

Figure 18:
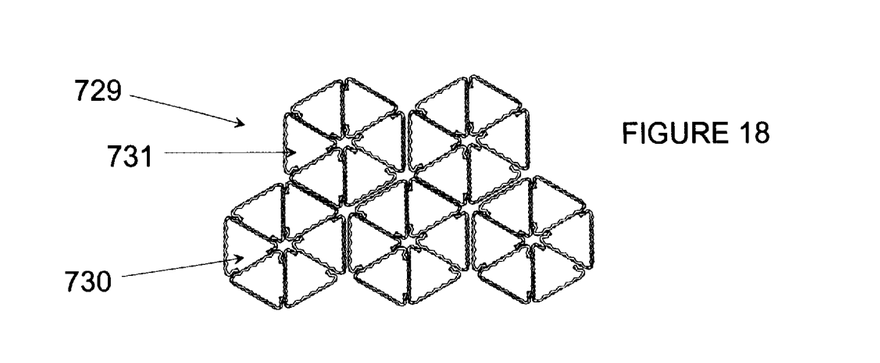
FIG. 18 is a two layer embodiment of the present invention where the bottom of the structural members of the first layer present a wide V-shaped contact to the sediment surface on which they will rest.

A one or two layers of the members 706 joined to remain in contact as in FIG. 18 may also be used as part of a boat wake suppression method. Boat wake waves are especially of concern in shore and bank erosion for sediments. As the sediment erodes from a shore or bank, that sediment naturally flows with the eroding water into the channel needed for navigation. It is an especial advantage to use the present invention substantially parallel to such shores or banks and thereby prevent or greatly reduce sediment erosion thereby.

Figure 21:
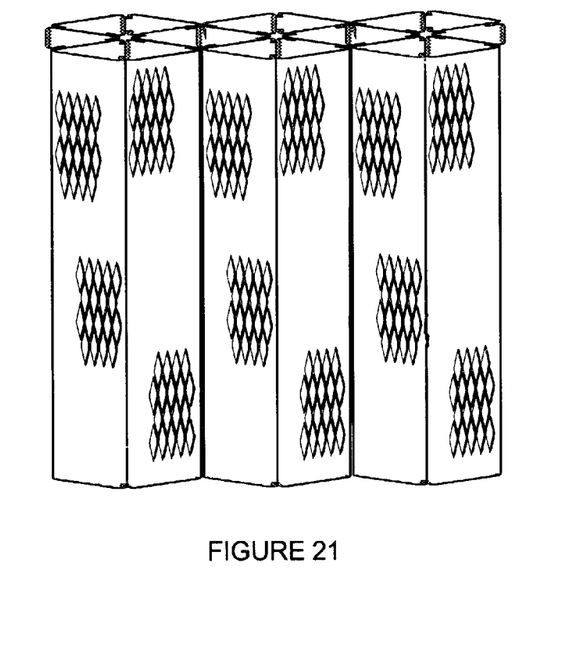
FIGS. 21 and 22 show respectively a partial vertical and angled group of the invention assemblies.
Figure 22:
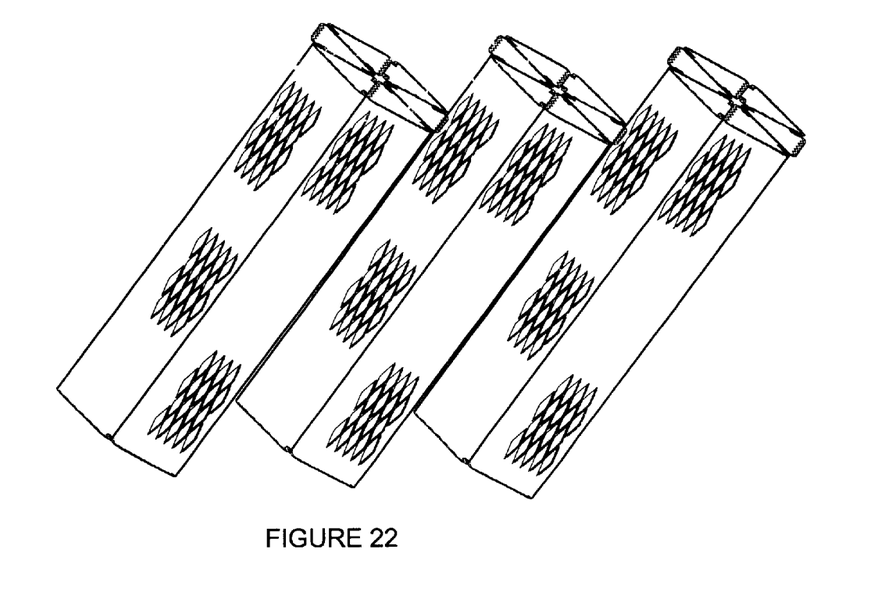

FIGS. 21 and 22 show a vertical and angled orientation for an exemplary single layer of the assemblies of the present invention. Such orientation may be preferred in some installations, such that the lowest edge of the joined assemblies supported within an excavation, concrete foundation and/or structural supports to maintain a substantially nonhorizontal orientation for facing wave or water flow containing sediment.

The above design options will sometimes present the skilled designer with considerable and wide ranges from which to choose appropriate apparatus and method modifications for the above examples. However, the objects of the present invention will still be obtained by that skilled designer applying such design options in an appropriate manner.

I claim:

1. A stacked assembly of structural members comprising:
   (a) each of the structural members comprising:
      (i) three or more longitudinally adjacently joined shafts, each shaft having a partial triangular and axial bore and four cross section support walls about the bore;

(ii) the first and second walls forming a first longitudinal vertex and each extending in cross section to respectively second and third vertices;

(iii) the third and fourth walls extending in cross section respectively from the second and third vertices such that the third and fourth walls are substantially in the same plane but do not touch each other;

(iv) each shaft located in the assembly such that all the first walls comprise an outer wall of the assembly;

(v) an outside surface of the third and fourth walls of each shaft abut an outside surface of the second wall of an adjacent shaft; and (vi) the walls comprise a grating adapted to retain or accumulate sediment when the structural member horizontally secured to a surface normal to a flow of sediment containing water;

(b) structural members joined and arranged adjacently in a horizontal plane to form one or more layers;

(c) arranging the layers such that the structural members are parallel, (d) the grating comprises a polymer form of a swaged or expanded grating; and (e) the grating comprises the polymer form having a rigid outer skin and a structural foam therebetween.

2. The assembly of claim 1 wherein the cross section length of the first wall is from about 3 inches to 24 inches.

3. The assembly of claim 2 wherein the cross section length of the first wall is from about 6 inches to 12 inches.

4. The assembly of claim 2 wherein the assembly has a length of over five feet.

* * * * *